June 9, 1942. H. HAYES Re. 22,109

GREETING REPLICA

Original Filed Feb. 15, 1939 2 Sheets-Sheet 1

INVENTOR
Helen Hayes
BY
ATTORNEY

June 9, 1942. H. HAYES Re. 22,109

GREETING REPLICA

Original Filed Feb. 15, 1939 2 Sheets-Sheet 2

INVENTOR
Helen Hayes
BY
ATTORNEY

Reissued June 9, 1942 Re. 22,109

UNITED STATES PATENT OFFICE 22,109

GREETING REPLICA

Helen Hayes, New York, N. Y.

Original No. 2,205,262, dated June 18, 1940, Serial No. 256,431, February 15, 1939. Application for reissue April 1, 1942, Serial No. 437,279

9 Claims. (Cl. 46—35)

This invention relates to new and useful improvements in a greeting replica.

The invention proposes a novel construction of a glorified post card, a mechanical (color) picture with two or more wings giving the illusion of a third dimension. It is proposed to so arrange the parts that it is possible to construct the glorified postcard of various sizes, shapes and designs. It is contemplated that the cards be replicas of various public places, public buildings and scenes, as for instance the "White House," "Mount Vernon," World's Fair buildings, booths and fairs, homes of motion picture stars, climax scenes of motion pictures, national and local points of interest, shrines, etc.

As another object of this invention it is proposed to provide the postcard with a novel lock lug which will hold the parts in extended positions.

Still further the invention proposes to arrange the card that it may be used for greetings, for games, advertising novelties, premiums, Christmas cards, and souvenirs.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
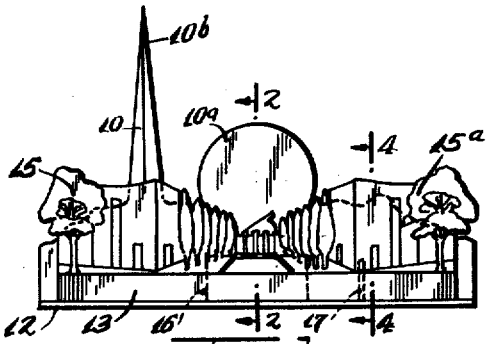
Fig. 1 is a front elevational view of an article constructed according to this invention.
Figure 3:
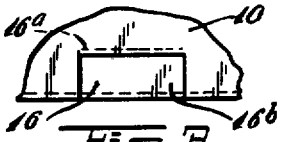
Fig. 3 is a fragmentary elevational view looking in the direction of the line 3—3 of Fig. 2.
Figure 2:
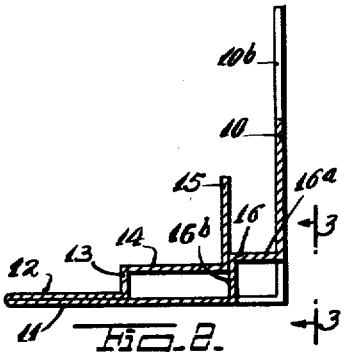
Fig. 2 is a vertical sectional view taken on the line 2—2 of Fig. 1.

The greeting replica, according to this invention, consists of a sheet of postcard material, or other sheet material suitable for the particular purpose, having a cutout background panel 10 extending substantially vertically and at its bottom connected with a base panel 11 extending to the front. A top panel 12 continues from the front edge of the base panel 11 and extends rearwards on said base panel for a short distance. A vertical edge panel 13 extends upwards from the rear edge of the top panel 12. A mezzanine panel 14 continues rearwards from the top edge of edge panel 13. A foreground panel 15 extends vertically from the rear of the mezzanine panel 14.

An angle tab 16 is stamped from the background panel and from the base panel and has a top wall portion 16[a] extending between said foreground panel 15 and said background panel 10. This angle tab also has a vertical wall 16[b] which is secured at an upper portion thereof to the rear face of the background panel 15. A lock lug 17 is stamped from the base panel 11 and is adapted to be folded upwards. This lock lug has a top edge 17[a] which then extends along the bottom face of the mezzanine panel 14 for supporting the same. It is also provided with a head portion 17[b] which extends up between the foreground panel 15 and the background panel 10 for holding these panels in vertical positions.

The greeting replica may be ornamented, cutout and decorated according to various designs and ideas. As illustrated, particularly in Fig. 1, the background panel 10 is shaped to conform with the perisphere 10[a] and the trylon 10[b], symbols of the World's Fair. The foreground 15 is imprinted with ornamentation 15[a].

Attention is called to the fact that the angle tab 16 in conjunction with portions of the base panel 11 and the background panel 10 form a parallelogram (in this particular case substantially a square) which permits the greeting replica to be folded. Furthermore, the mezzanine panel 14 is arranged to be parallel to the base panel 11, while the edge panel 13 is parallel to the wall 16[b] of the angle tab. This arrangement forms another parallelogram which permits the folding of the replica.

In order to fold the replica it is required that the lock lug 17 be first folded down within an opening in the base panel 11 from which it was stamped. It is then possible to fold the background panel 10 forwards and downwards until it rests on the other portions immediately adjacent it.

Figure 5:
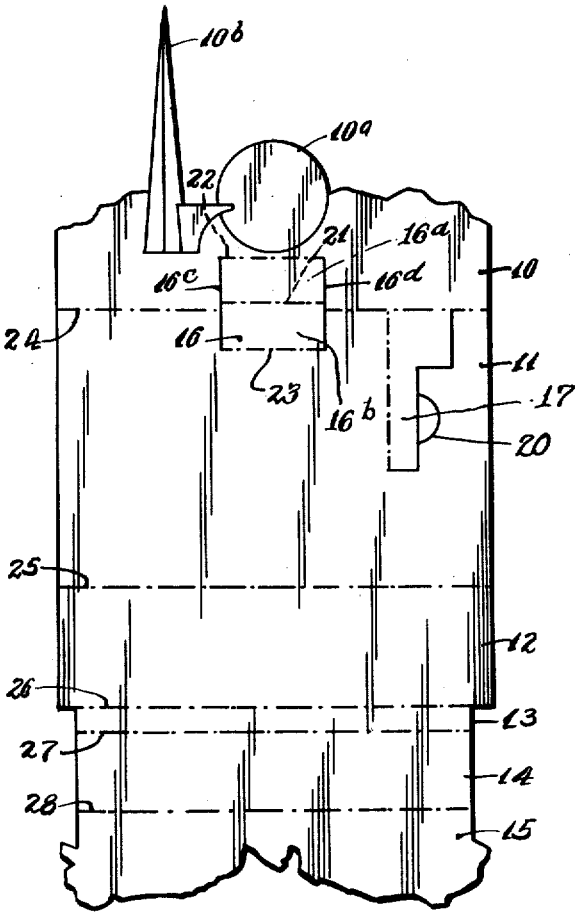
Fig. 5 is a developed view of the article illustrating the blank from which it is constructed.
Figure 4:
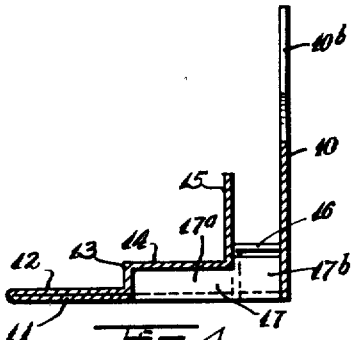
Fig. 4 is a sectional view taken on the line 4—4 of Fig. 1.

In Fig. 5 a developed view has been shown of the blank used in constructing the article. It should be noted that immediately adjacent the free side of the lock lug 17 there is a cutout 20 adapted to receive the tip of one's finger to facilitate the folding upwards and downwards of the lock lug. The angle tab 16 is stamped from the material of the blank between two parallel cut lines 16[c] and 16[d]. Then the angle tab is folded outwards along a central score line 21 and the end score lines 22 and 23. A score line 24 defines the boundary between the background panel 10 and the base panel 11. The score line 25 defines the boundary between the base panel 11 and the top panel 12. Numerals 26 and 27 indicate score lines defining the edge panel 13. Score lines 27 and 28 define the mezzanine panel 14.

Figure 6:
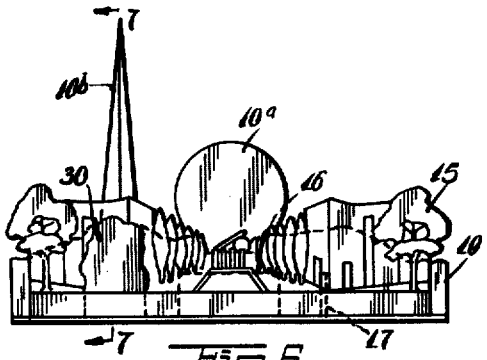
Fig. 6 is a front elevational view of the article constructed according to another form of this invention.
Figure 8:
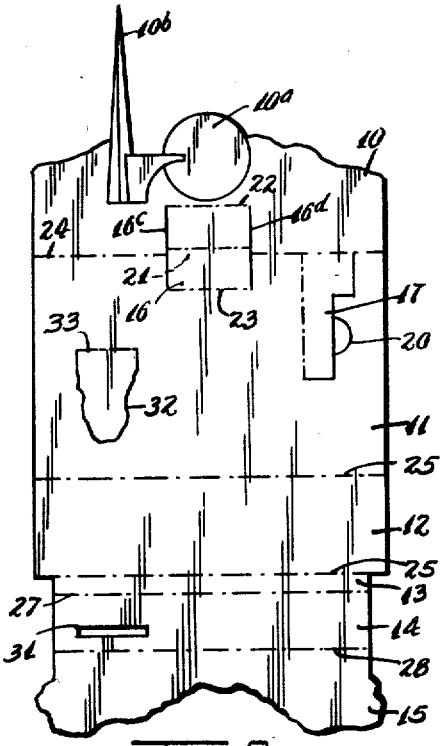
Fig. 8 is a blank from which the article shown in Figs. 6 and 7 has been constructed.
Figure 7:
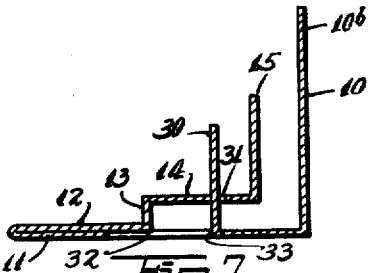
Fig. 7 is a sectional view on the line 7—7 of Fig. 6.

In Figs. 6–8 inclusive another embodiment of the invention has been disclosed which is very similar to the prior form, distinguishing merely in the fact that an auxiliary foreground panel 30 has been stamped from the material of the base panel 11 and has been bent upwards and extended through a slot 31 formed in the mezzanine panel 14. The auxiliary foreground panel 30 is formed by a cut line 32 defining its sides and top (see Fig. 8) and a score line 33 defining its base. In other respects this form of the invention is similar to the previous form.

Figure 11:
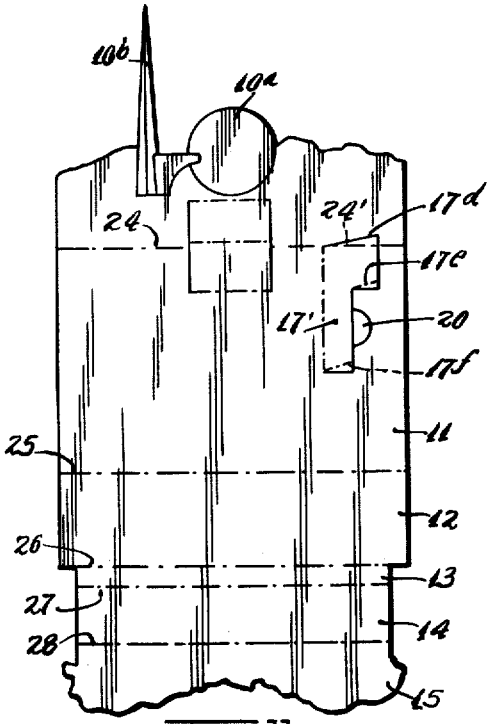
Fig. 11 is the blank of the article shown in Figs. 9 and 10.
Figure 10:
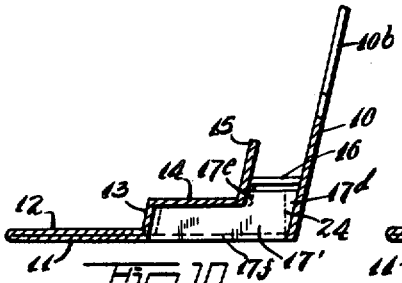
Fig. 10 is a view of the article shown in Fig. 9 with parts in one position.
Figure 9:
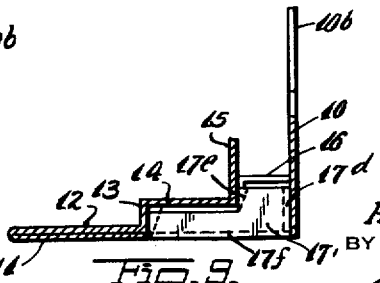
Fig. 9 is a transverse sectional view similar to Fig. 4 but illustrating a modification of the invention.

Figs. 9–11 inclusive show a modified form of the invention but distinguishes from the form illustrated in Figs. 1 and 5 in the construction of the lock lug. According to this form of the invention there is a lock lug 17' stamped from the material of the blank in a manner so that the head end has an inclined side 17[d] cutout from the material of the background panel.

The head is also formed with an inclined score line 17[e] on the edge directly behind the inclined side 17[d]. The front end of the main portion of the lug 17' is formed with an inclined score line 17[f]. A portion 24' of the score line 24 separates the extension portion 17[d].

The lock lug may be used to hold the background and foreground panels vertically as shown in Fig. 9. When thus used the extension 17[d] is bent at right angles to the remaining portion of the head piece. When required, the foreground and background panels may be caused to tilt rearwards by an adjustment of the lock lug. To do this the extension 17[d] is bent into the same plane as the remaining portion of the lock lug (see Fig. 10). Simultaneously, the portions to the front of the score lines 17[e] and 17[d] are bent at right angles to the main portion of the lock lug. The parts now assume the condition illustrated in Fig. 10. In other respects this form of the invention is similar to the previous forms.

While I illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A greeting replica, comprising a sheet of material having a cutout background panel extending substantially vertically and at its bottom connecting with a base panel extending to the front, a top panel continuing from the front edge of said base panel and extending rearwards on said base panel for a short distance, a vertical edge panel on the rear edge of said top panel, a mezzanine panel continuing rearwards from the top edge of said edge panel for a short distance, a foreground panel extending vertically from the rear of said mezzanine panel, an angle tab stamped from the background panel and the base panel and having a top wall extending between said foreground panel and said background panel and also having a vertical wall secured at an upper portion to said foreground panel, and a lock lug stamped from said base panel for being bent up against said mezzanine panel and between said foreground and background panels.

2. A greeting replica, comprising a sheet of material having a cutout background panel extending substantially vertically and at its bottom connection with a base panel extending to the front, a top panel continuing from the front edge of said base panel and extending rearwards on said base panel for a short distance, a vertical edge panel on the rear edge of said top panel, a mezzanine panel continuing rearwards from the top edge of said edge panel for a short distance, a foreground panel extending vertically from the rear of said mezzanine panel, an angle tab stamped from the background panel and the base panel and having a top wall extending between said foreground panel and said background panel and also having a vertical wall secured at an upper portion to said foreground panel, and a lock lug stamped from said base panel for being bent up against said mezzanine panel and between said foreground and background panels, said angle tab having its top wall parallel to the base panel and its vertical wall parallel to the said vertical background panel.

3. A greeting replica, comprising a sheet of material having a cutout background panel extending substantially vertically and at its bottom connecting with a base panel extending to the front, a top panel continuing from the front edge of said base panel and extending rearwards on said base panel for a short distance, a vertical edge panel on the rear edge of said top panel, a mezzanine panel continuing rearwards from the top edge of said edge panel for a short distance, a foreground panel extending vertically from the rear of said mezzanine panel, an angle tab stamped from the background panel and the base panel and having a top wall extending between said foreground panel and said background panel and also having a vertical wall secured at an upper portion to said foreground panel, and a lock lug stamped from said base panel for being bent up against said mezzanine panel and between said foreground and background panels, said angle tab having its top wall parallel to the base panel and its vertical wall parallel to the said vertical background panel, said angle tab being formed by parallel cuts in the material and the portion between these cuts being bent on a transverse line extending between said cuts.

4. A greeting replica, comprising a sheet of material having a cutout background panel extending substantially vertically and at its bottom connecting with a base panel extending to the front, a top panel continuing from the front edge of said base panel and extending rearwards on said base panel for a short distance, a vertical edge panel on the rear edge of said top panel, a mezzanine panel continuing rearwards from the top edge of said edge panel for a short distance, a foreground panel extending vertically from the rear of said mezzanine panel, an angle tab stamped from the background panel and the base panel and having a top wall extending between said foreground panel and said background panel and also having a vertical wall secured at an upper portion to said foreground panel, and a lock lug stamped from said base panel for being bent up against said mezzanine panel and between said foreground and background panels, said base panel being formed with a finger tip cutout immediately adjacent to said lock lug to facilitate operation thereof.

5. A greeting replica, comprising a sheet of material having a cutout background panel extending substantially vertically and at its bottom connecting with a base panel extending to the front, a top panel continuing from the front edge of said base panel and extending rearwards on said base panel for a short distance, a vertical edge panel on the rear edge of said top panel, a mezzanine panel continuing rearwards from the top edge of said edge panel for a short distance, a foreground panel extending vertically from the rear of said mezzanine panel, an angle tap stamped from the background panel and the base panel and having a top wall extending between said foreground panel and said background panel and also having a vertical wall secured at an upper portion to said foreground panel, and a lock lug stamped from said base panel for being bent up against said mezzanine panel and between said foreground and background panels, and an auxiliary foreground panel stamped from the material of the base panel and extended upwards through a slot in said mezzanine panel.

6. A greeting replica, comprising a sheet of material having a cutout background panel extending substantially vertically and at its bottom connecting with a base panel extending to the front, a top panel continuing from the front edge of said base panel and extending rearwards on said base panel for a short distance, a vertical edge panel on the rear edge of said top panel, a mezzanine panel continuing rearwards from the top edge of said edge panel for a short distance, a foreground panel extending vertically from the rear of said mezzanine panel, an angle tab stamped from the background panel and the base panel and having a top wall extending between said foreground panel and said background panel and also having a vertical wall secured at an upper portion to said foreground panel, and a lock lug stamped from said base panel for being bent up against said mezzanine panel and between said foreground and background panels, said lock lug having an extension portion with an inclined edge, and having inclined score lines parallel to said edge and edges engaging said edge panel and said foreground panel.

7. A greeting replica, comprising a sheet of material having a cutout background panel extending substantially vertically and at its bottom connecting with a base panel extending to the front, a top panel continuing from the front edge of said base panel and extending rearwards on said base panel for a short distance, a vertical edge panel on the rear edge of said top panel, a mezzanine panel continuing rearwards from the top edge of said edge panel for a short distance, a foreground panel extending vertically from the rear of said mezzanine panel, and an angle tab stamped from the background panel and the base panel and having a top wall extending between said foreground panel and said background panel and also having a vertical wall secured at an upper portion to said foreground panel.

8. A greeting replica, comprising a sheet of material having a cutout background panel extending substantially vertically and at its bottom connecting with a base panel extending to the front, a top panel continuing from the front edge of said base panel and extending rearwards on said base panel for a short distance, a vertical edge panel on the rear edge of said top panel, a mezzanine panel continuing rearwards from the top edge of said edge panel for a short distance, a foreground panel extending vertically from the rear of said mezzanine panel, and an angle tab stamped from the background panel and the base panel and having a top wall extending between said foreground panel and said background panel and also having a vertical wall secured at an upper portion to said foreground panel, said angle tab having its top wall parallel to the base panel and its vertical wall parallel to the said vertical background panel.

9. A greeting replica, comprising a sheet of material having a cutout background panel extending substantially vertically and at its bottom connecting with a base panel extending to the front, a top panel continuing from the front edge of said base panel and extending rearwards on said base panel for a short distance, a vertical edge panel on the rear edge of said top panel, a mezzanine panel continuing rearwards from the top edge of said edge panel for a short distance, a foreground panel extending vertically from the rear of said mezzanine panel, and an angle tab stamped from the background panel and the base panel and having a top wall extending between said foreground panel and said background panel and also having a vertical wall secured at an upper portion to said foreground panel, said angle tab having its top wall parallel to the base panel and its vertical wall parallel to the said vertical background panel, said angle tab being formed by parallel cuts in the material and the portion between these cuts being bent on a transverse line extending between said cuts.

HELEN HAYES.